3,776,959
PREPARATION OF AMINE OXIDES IN NON-POLAR SOLVENT SYSTEMS

Joseph S. Stalioraitis and Charles S. Wilhelmy, Chicago, Ill., assignors to Akzona Incorporated, Asheville, N.C.
No Drawing. Continuation-in-part of application Ser. No. 686,805, Nov. 30, 1967, now Patent No. 3,558,710, dated Jan. 26, 1971. This application Jan. 25, 1971, Ser. No. 109,574

The portion of the term of the patent subsequent to Jan. 26, 1988, has been disclaimed Int. Cl. C07c 85/00

U.S. Cl. 260—583 D          6 Claims

ABSTRACT OF THE DISCLOSURE

Substantially anhydrous amine oxides are prepared by reacting a tertiary amine with hydrogen peroxide in a non-polar solvent system and removing water from the reaction mass azeotropically.

CROSS REFERENCE TO RELATED APPLICATION

This application is a continuation-in-part application of our pending application Ser. No. 686,805, filed Nov. 30, 1967, now U.S. Pat. 3,558,710, issued Jan. 26. 1971.

The prior art has proposed the preparation of amine oxides from tertiary amines by reaction with hydrogen peroxide in an aqueous reaction medium or one that contains polar solvents such as acetone as exemplified by Swiss Pat. No. 177,456. Generally, amine oxides are produced in aqueous solutions. For many uses the amine oxide containing appreciable amounts of water is undesirable. We do not know of prior methods of obtaining substantially anhydrous amine oxides utilizing non-polar solvents.

This invention pertains to a process for the preparation of amine oxides which overcomes the above objections. More particularly, the invention provides a novel improved process for the preparation and recovery of amine oxides in the substantially anhydrous state. Even more specifically, the invention pertains to the production of substantially anhydrous amine oxides by reacting a tertiary amine with hydrogen peroxide in a non-polar solvent and simultaneously removing water and solvent during the reaction by azeotropic distillation.

It is therefore an object of this invention to prepare amine oxides from tertiary amines while carrying out the reaction in a non-polar solvent.

It is still a further object of this invention to produce amine oxides by reacting tertiary amines with hydrogen peroxide in non-polar solvent and simultaneously removing water and solvent from the reaction vessel.

It is another further object of this invention to produce substantially anhydrous amine oxides by reacting a tertiary amine with hydrogen peroxide in non-polar solvent and thereafter removing water from the reaction mass azeotropically.

Another object of this invention is to prepare substantially anhydrous amine oxides by reacting a tertiary amine such as di-(2-hydroxyethyl)cocoamine with hydrogen peroxide in a non-polar solvent such as xylene with the simultaneous removal of water from the reaction mass by azeotropic distillation.

It is still a further important object of this invention to improve the method of producing amine oxides wherein a tertiary amine is reacted with hydrogen peroxide by carrying out the reaction in non-polar solvent, azeotropically removing the water from the reaction mass and thereafter recovering amine oxide.

These and other further important objects will become apparent from the disclosure and from reference to the specific, detailed examples.

Generally, the method of the invention comprises fluidizing a tertiary amine with a suitable amount of non-polar solvent and thereafter adding a peroxide such as hydrogen peroxide over a period of time in order to obtain reaction and conversion of the tertairy amine to the amine oxide. It is generally preferred to heat the amine-solvent mixture prior to hydrogen peroxide addition. During the reaction or after the reaction is completed, water obtained from the solution of hydrogen peroxide as well as that obtained as a reaction product is removed along with the non-polar solvent by azeotropic distillation thereby obtaining substantially anhydrous amine oxide as the end product. Generally speaking, the azeotropic distillation conditions will vary with the type of non-polar solvent used, but in each case it is important to the process that the temperature be such that it is below the decomposition point of the specific amine oxide formed.

Specifically, a tertiary amine is added to a reaction vessel, such as a round bottomed flask or reactor with substantial amount of head space, about 25 to 50% being preferred and 32 to 35% especially preferred. Depending upon the molecular weight of the tertiary amine, there is added a suffiicent amount of non-polar solvent to fluidize the amine to insure proper contact with the later added hydrogen peroxide. The amine-non-polar solvent composition is heated and hydrogen peroxide is added with stirring. The peroxide may be added in aqueous solution form wherein the hydrogen peroxide concentration is about 1 to 90 weight percént, the preferred range being about 30 to 50 weight percent. Those skilled in the art will recognize that the only limitations of hydrogen peroxide concentration are safety ones.

In a preferred form of the invention, the reaction mass is maintained at a temperature sufficient to promote reaction during hydrogen peroxide addition and sufficient to azeotrope water from the system. Because the reaction involved is exothermic, it may be necessary to cool the reaction mass and maintain temperatures below the decomposition temperature of the formed amine oxide. Ordinarily, the temperature should not be over about 100° C., about 40° to 100° C. is suitable and about 60° to 90° C. is preferred.

After a period of time it may be necessary to add additional solvent in order to maintain fluidity of the reaction mass mixture. After completion of the reaction and after azeotropic distillation, it will be found that amine oxide is recovered in the substantially anhydrous state, that is no more than about 1 to 2 weight percent water present. Reaction times may vary but ordinarily about ½ to 10 hours is suitable.

It is desirable to continuously azeotrope water and return substantially dry solvent to the reactor. In such case, the solvent-water mixture removed by azeotropic distillation is treated to separate the solvent from the water and the solvent is recirculated into the reactor. Other obvious expedients will be readily observable to those skilled in the art.

Suitable amines for conversion to amine oxides include the tertiary amines in which the groups directly bonded to the amino nitrogen atom are hydrocarbon groups and those in which the groups directly bonded to the amino nitrogen atom are substituted hydrocarbon in character. The hydrocarbon groups bonded to the amino nitrogen atom may be aliphatic or aromatic in character. The aliphatic groups may be of a branched chain or a straight chain configuration or they may be cyclic in character; they may be saturated or they may be olefinically unsaturated. The aliphatic groups may be the same or different.

Tertiary amines particularly suitable for the practice of this invention include those of the formulae:

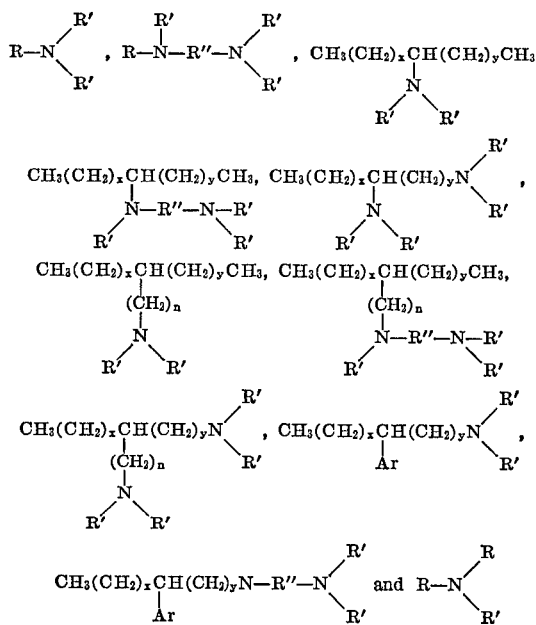

wherein:

R is of the group $C_6$–$C_{22}$ alkyl and alkenyl;
R' is of the group of

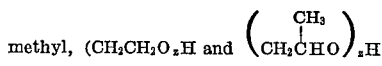

methyl, $(CH_2CH_2O)_zH$ and $\left(CH_2\overset{CH_3}{\underset{}{C}}HO\right)_zH$ wherein $z$ is a positive integer from 1 to about 25;
R'' is of the group of $C_2$–$C_6$ alkylene;
$x$ and $y$ are positive integers having a sum from 1 to about 22;
$n$ is a positive integer from 1 to about 2; and
Ar is selected from the group of phenyl, naphthyl, and phenyl substituted with from 1 to 2 groups selected from methyl, hydroxy, methoxy and phenoxy.

Other amines as well as processes of preparing these amines may be found in U.S. Pat. No. 3,398,197 and U.S. Pat. No. 3,494,962, the disclosures of which are hereby incorporated by reference.

The types of amine oxides formed according to the present invention include those of the following formulae:

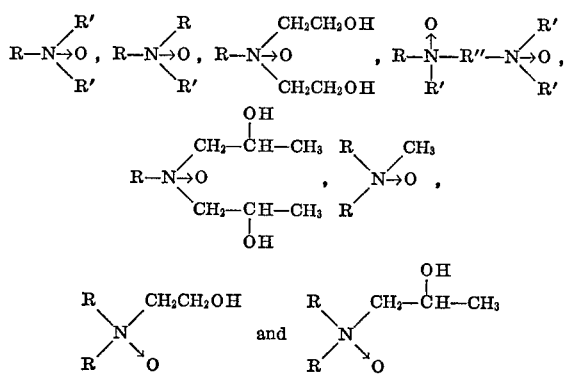

wherein R, R' and R'' are identified above.

R as identified above may be alkyl and alkenyl groups including hexyl, heptyl, octyl, nonyl, decyl, hendecyl, dodecyl, tridecyl, tetradecyl, pentadecyl, hexadecyl, heptadecyl, octadecyl, nonadecyl, eicosyl, docosyl, hexenyl, heptenyl, octenyl, nonenyl, decenyl, hendecenyl, dodecenyl, tridecenyl, tetradecenyl, pentadecenyl, hexa- decenyl, heptadecenyl, octadecenyl, nonadecenyl, eicosenyl, docosenyl, octadecadienyl, octadecatrienyl and mixtures thereof such as found in fats and oils including coconut, soybean, tallow and tall oil.

The alkylene group R'' may contain from 2 to 6 carbon atoms; that is the alkylene group may be dimethylene, trimethylene, tetramethylene, pentamethylene or hexamethylene and their branched chain isomers such as 2-methyl-1,3-propylene, 1-methyl-1,3-propylene and 1-methyl ethylene. One especially preferred embodiment is the presence of the trimethylene group.

The hydrogen peroxide employed may be in the form of an aqueous solution containing from about 10% to about 90% by weight of hydrogen peroxide. Particularly useful are the commercially available aqueous solutions containing from about 35% to about 70% by weight of hydrogen peroxide. It is preferable that the highest practical concentration of hydrogen peroxide consistent with safe handling be employed to minimize water content since water is subsequently removed. For the same reason, while it is quite feasible to employ stoichiometric quantities of the hydrogen peroxide relative to the amine reactant, that is, one mole of hydrogen peroxide per mole of amine, it is desirable that the hydrogen peroxide be present in the reaction zone in an amount somewhat in excess of the theoretical amount. The excess of hydrogen peroxide need not exceed 100%, and in most cases an excess of hydrogen peroxide of about 10 to 50% will be found sufficient for the desired purpose.

The oxidation of the amine can be carried out at atmospheric, superatmospheric or subatmospheric pressure, as may be desirable. In the great majority of cases, it will be found that operation at substantially atmospheric pressure will be found to be most convenient. Preferred temperatures for effecting the reaction are of the order of from about 40° C. to about 100° C. In most cases, little advantage will be obtained through the use of temperatures in excess of about 100° C. as compared to the use of somewhat lower temperatures. As a matter of fact, temperatures over 100° C. may be detrimental as the amine oxide formed will decompose. Under these conditions of temperature and pressure, reaction times of the order of from about one-half hour to about ten hours will be found sufficient to effect the desired reaction to completion.

Suitable non-polar solvents for use in this invention include aromatic hydrocarbons, aliphatic hydrocarbons and chlorinated hydrocarbons. Specific examples include, but are not limited to, benzene, toluene, xylene, high boiling mineral spirits, kerosene, carbon tetrachloride, dichloroethane, hexane, heptane and the like solvents, of which the art is well aware. Mixtures of the foregoing solvents may be used if desired.

The amount of the non-polar solvent used is not critical, but sufficient non-polar solvent should be employed to fluidize the amine reactant and to remove contained water from the reaction system. If the solvent is recycled, lesser total amounts of solvent are required. Generally the weight of non-polar solvent used is from less than the weight of the amine reactant to several times the weight of the amine. Usually, not more than about five to ten times the weight of the amine reactant of non-polar solvent need be used. In most cases a weight of non-polar solvent of from about 1 to about 4 times the weight of the amine reactant is most convenient.

In conducting the reaction of the amine and the hydrogen peroxide, it is desirable that the reactants be brought together slowly. In most cases, it will be found most desirable that the amine reactant be mixed with the non-polar solvent, and the hydrogen peroxide added slowly to the stirred reaction mixture, the reaction temperature being controlled by heating or cooling as necessary. The order of mixing may be different, however, addition of the hydrogen peroxide to the amine is the preferred technique, since it permits better control of the reaction and minimization of undesired by-products.

This invention is further illustrated by the following specific examples wherein the amine oxide was analyzed by the following procedure:

A first sample is titrated with acid to determine free amine and amine oxide; a second sample is treated with methyl iodide which converts the free amine to quaternary ammonium iodide which is non-titratable by acid; the second sample is then titrated with acid to determine residual amine oxide (which is titratable); and from the difference between the two samples, the amount of free amine and the amount of amine oxide may be determined.

The foregoing analysis procedure is set forth at Analytical Chemistry, vol. 34, p. 1849, 1962.

EXAMPLE I

To 574 g. di-(2-hydroxyethyl) cocoamine ("Ethomeen C/12") in a reactor was added 456 g. toluene. To the amine-solvent mixture was added 163 g. of 46 wt. percent hydrogen peroxide solution, while stirring the reaction mass, over an addition period of 1½ hours at a temperature of 70°–76° C. Conversion of amine to amine oxide took place over a period of about 4–5 hours during which the temperature of the reaction mass was about 76°–84° C. Azeotropic distillation of the resultant reaction mass at 83° C. at atmospheric conditions over a period of about 5 hours yielded a product in solvent having the following analysis by weight percent:

| | |
|---|---|
| Amine oxide | 45.2 |
| Free amine | 1.4 |
| $H_2O_2$ | .6 |

EXAMPLE II

Using the same general procedure as indicated in Example I substituting the reactants as follows:

| | G. |
|---|---|
| Di-(2-hydroxyethyl) cocoamine | 578 |
| Benzene | 457 |
| 64 wt. percent $H_2O_2$ soln. | 117 |

The following Table I shows the time sequence for the above described reaction system illustrating the simultaneous distillation and oxidation aspect of the invention:

EXAMPLE III

Using the same general procedure as Example I, the following reaction system was used:

| | G. |
|---|---|
| Ethomeen C/12 | 402 |
| Xylene | 349 |
| 64 wt. percent $H_2O_2$ aqueous solution | 82 |

The following Table II shows the time sequence and analysis of the reaction system.

TABLE II

| | Temp., ° C. | | Pressure, mm. Hg | $H_2O_2$ in grams | Water off, mls. | Analysis, wt. percent | | | |
|---|---|---|---|---|---|---|---|---|---|
| Time | Pot | Vapor | | | | Amine oxide | Free amine | $H_2O_2$ | $H_2O$ |
| 10:30 | 49 | 34 | 80 | | | | | | |
| 10:35 | 54 | 44 | 80 | | | | | | |
| 10:45 | 59 | 45 | 86 | 41 | 10 | | | | |
| 11:00 | 59 | 29 | 70 | | 22 | 45.7 | 5.4 | 1.15 | |
| 11:15 | 59 | 45 | 80 | 82 | 30 | | | | |
| 11:30 | 55 | 39 | 46 | | 42 | | | 1.54 | |
| 11:45 | 56 | 39 | 40 | | 47 | | | | |
| 12:00 | 56 | 42 | 20 | | 51 | 49.4 | 4.3 | 1.6 | |
| 12:35 | 65 | 59 | 20 | | 54 | | | | |
| 1:00 | 67 | 60 | 20 | | 54 | 54.0 | 4.5 | 1.2 | |
| 4:35 | 62 | 34 | 20 | | 55 | Added 50 ml. xylene | | | |
| 4:45 | 60 | 56 | 20 | | 55 | | | | |
| Final | | | | | 62 | 54.4 | 1.3 | .47 | 2.4 |

EXAMPLE IV 267.5 gms. (0.25 mole) of coco (15 mole propylene oxide adduct) tertiary amine (Propomeen C/25) 90% pure was mixed with 1,000 gms. 1,2-dichloroethane in a 5 liter reaction flask equipped with an efficient stirrer, thermometer, and condenser. After the mixture was heated to about 55° C., 26 gms. of 50 wt. percent hydrogen peroxide was added dropwise. The hydrogen peroxide addition was adjusted so the reaction temperature was maintained at about 65 to 70° C. After the hydrogen peroxide was added, the reactor contents were digested at about 68° C. for four hours. The water was distilled out by azeotroping with dichloroethane at about 72° C.

The product was analyzed and found to contain, in addition to solvent:

| | Weight percent |
|---|---|
| Amine oxide | 12.0 |
| Unreacted tertiary amine | 5.1 |
| Water | 0.6 |
| Hydrogen peroxide | 0.12 |

The amine oxide was coco (15 mole propylene oxide adduct) tertiary amine oxide.

EXAMPLE V

The procedure of Example IV was followed with the following reaction system:

| | |
|---|---|
| Di-(hydrogenated tallow) methyltertiary amine 96% pure | 23 gms. (1 mole). |
| $H_2O_2$ (50 wt. percent in $H_2O$) | 68 gms. |
| Cyclohexane | 1,060 gms. |

TABLE I

| | Temp., ° C. | | $H_2O_2$ in, ml. | $H_2O$ off, ml. | Analysis | | | | Gardner color |
|---|---|---|---|---|---|---|---|---|---|
| Time | Pot | Vapor | | | Amine oxide | Free amine | $H_2O_2$ | $H_2O$ | |
| 10:50 | 52 | | 0 | 0 | | | | | |
| 10:55 | 72 | | 17 | 0 | | | | | |
| 11:30 | 75 | 70 | 58 | 0 | Reflux starts | | | | |
| 12:00 | 74 | 70 | 94 | 10 | 52.4 | 0.9 | 0.95 | | 1 |
| 12:30 | 74 | 70 | | 21 | Slight thickening of reaction mass | | | | |
| 1:00 | 75 | 70 | | 34 | | | | | |
| 1:30 | 77 | 72 | | 45 | | | | | |
| 2:00 | 78 | 74 | | 54 | | | | | |
| 2:30 | 79 | 76 | | 62 | | | | | |
| 3:00 | 80 | 76 | | 68 | | | | | |
| 3:30 | 82 | 77 | | 73 | | | | | |
| 4:00 | 83 | 77 | | 75 | | | | | |
| 4:30 | 83 | 77 | | 76 | 52.4 | 1.9 | 0.65 | 2.0 | <1 |

After four hours an additional 240 gms. of hydrogen peroxide, as used above, was added. The mixture was digested for six hours and water-cyclohexane as azeotroped out at 65° C.

The product was analyzed and found to contain, in addition to solvent:

| | Weight percent |
|---|---|
| Amine oxide | 21.5 |
| Unreacted tertiary amine | 7.4 |
| Water | 0.7 |
| Hydrogen peroxide | 0.12 |

The amine oxide was di-(hydrogenated tallow) methyl-tertiary amine oxide.

EXAMPLE VI

The procedure of Example IV was followed with the following reaction system:

| | |
|---|---|
| N-tallow trimethylene diamine (3 moles ethylene oxide adduct) tertiary amine (Ethoduomeen TD/13) | 135.3 gms. (0.3 mole). |
| $H_2O_2$ (50 wt. percent in $H_2O$) | 60.0 gms. (0.9 mole). |
| Hexane | 750.0 gms. |

The mixture was digested for three hours at about 60° C. and about 41 gms. of water was azeotroped out. 500 gms. of additional hexane was added to dilute the product.

The product was analyzed and found to contain, in addition to solvent:

| | Weight percent |
|---|---|
| Amine oxide | 11.2 |
| Unreacted tertiary amine | 1.5 |
| Water | Trace |
| Hydrogen peroxide | Trace |

The amine oxide was N-tallow trimethylene diamine (3 moles ethylene oxide adduct) tertiary amine oxide.

EXAMPLE VII

The procedure of Example IV was followed with the following reaction system:

| | |
|---|---|
| $H_2O_2$ (50 wt. percent in $H_2O$) | 13.9 gms. (4.26 moles). |
| Dimethyloctadecyl amine | 320.0 gms. (4.7 moles). |
| Heptane | 705.0 gms. |

The mixture reacted in the same maner as Example VI with the water azeotroped out at about 96° C. vapor temperature. 210 gms. of water were distilled.

The product was analyzed and found to contain, in addition to solvent:

| | Weight percent |
|---|---|
| Amine oxide | 35.2. |
| Unreacted tertiary amine | 13.5. |
| Water | 1.5 approx. |
| Hydrogen peroxide | Trace. |

The amine oxide was dimethyloctadecy amine oxide.

EXAMPLE VIII

A plant-batch run was conducted using the procedure described in Example I. 1,450 pounds of di-(2-hydroxyethyl)-cocoamine was mixed with 3,270 pounds of xylene. A total of 361 pounds of 50 weight percent active aqueous hydrogen peroxide was slowly added to the reaction vessel.

The following Table III shows the time sequence for the above described reaction system together with analysis of the contents of the reaction vessel.

TABLE III

| Time hours | Temp.,° C. Pot | Temp.,° C. Vapor | Pressure, mm. Hg | Analysis, weight percent Amine | Analysis, weight percent Amine oxide | Analysis, weight percent $H_2O_2$ | Analysis, weight percent $H_2O$ |
|---|---|---|---|---|---|---|---|
| 0 | | | | | | | |
| 3 | 65-70 | | | 2.4 | 26.9 | 0.35 | |
| 4 | 65 | | | 2.6 | 26.8 | 0.50 | |
| 5 | 70 | | | 0.7 | 28.6 | 0.34 | |
| 9 | 47 | | (¹) | | | | |
| 10 | 48-49 | 38 | 310 | Thickening, increasing temperature | | | |
| 12 | 48 | 46 | 75 | | | | |
| 13½ | 56 | 53 | 80 | | 33.5 | | 3.6 |
| 14½ | 55 | 52 | 65 | | 35.6 | | 2.5 |
| 15½ | 52 | 51 | 40 | | 38.6 | | 1.85 |
| 16½ | 58-59 | 55 | 40 | 1.8 | 40.1 | | 1.3 |
| 17½ | 60 | 56 | 40 | 1.9 | 43.5 | | 1.1 |
| 18½ | | | | 0.72 | 49.2 | | 1.38 |

¹ Start vacuum.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In the process for producing amine oxides wherein a tertiary amine selected from the group consisting of di-2-hydroxy-ethyl coco amine, coco tertiary amine, di-(hydrogenated tallow) methyl-tertiary amine, dimethyl octadecyl tertiary amine and N-tallow trimethylene diamine tertiary amine is reacted with hydrogen peroxide, the improvement comprising carrying out the reaction in a nonpolar solvent selected from the group consisting of benzene, toluene, xylene, 1,2-dichloroethylene, cyclohexane, heptane and mixtures thereof, and azeotropically removing water from the reaction mass at a temperature below the decomposition temperature of the amine oxide formed in said reaction.

2. The process of claim 1 wherein said azeotropic removal of water is carried out during said reaction.

3. The process of claim 1 wherein the solvent removed azeotropically from said reaction system with water is separated from said water and re-circulated to said reaction system.

4. The process of claim 1 wherein said amine oxide is recovered in substantially anhydrous state.

5. The process of claim 1 wherein said reaction is carried out at a temperature of about 40° to 100° C.

6. The process of claim 1 wherein said reaction is carried out at a temperature of about 60° to 90° C.

References Cited

UNITED STATES PATENTS 3,558,710    1/1971    Stalioraitis et al. ___ 260—584 R

LEWIS GOTTS, Primary Examiner

R. L. RAYMOND, Assistant Examiner

U.S. Cl. X.R.

260—570.5 P, 570.8 R, 583 R, 583 P, 584 R, 584 B